United States Patent
Chakra et al.

(10) Patent No.: US 10,380,255 B2
(45) Date of Patent: *Aug. 13, 2019

(54) ASSOCIATION OF AN EMOTIONAL INFLUENCER TO A POST IN A SOCIAL MEDIUM

(71) Applicant: INTERNATIONAL BUSINESS MACHINES CORPORATION, Armonk, NY (US)

(72) Inventors: Al Chakra, Apex, NC (US); Liam Harpur, Dublin (IE); John Rice, Waterford (IE)

(73) Assignee: International Business Machines Corporation, Armonk, NY (US)

( * ) Notice: Subject to any disclaimer, the term of this patent is extended or adjusted under 35 U.S.C. 154(b) by 172 days.

This patent is subject to a terminal disclaimer.

(21) Appl. No.: 14/718,251

(22) Filed: May 21, 2015

(65) Prior Publication Data

US 2016/0072903 A1 Mar. 10, 2016

Related U.S. Application Data

(63) Continuation of application No. 14/482,854, filed on Sep. 10, 2014.

(51) Int. Cl.
*H04L 29/08* (2006.01)
*G06F 17/27* (2006.01)
(Continued)

(52) U.S. Cl.
CPC ........ *G06F 17/2785* (2013.01); *G06F 16/337* (2019.01); *H04L 51/32* (2013.01)

(58) Field of Classification Search
CPC ........... G06F 17/2785; G06F 17/30702; G06F 17/28; H04L 51/32
See application file for complete search history.

(56) References Cited

U.S. PATENT DOCUMENTS

2008/0154883 A1* 6/2008 Chowdhury .......... G06F 3/0482
2012/0095976 A1* 4/2012 Hebenthal ......... G06F 17/30867
707/706
(Continued)

FOREIGN PATENT DOCUMENTS

WO WO 2014/130484 A1 * 8/2014 ............. G06F 17/00

OTHER PUBLICATIONS

International Business Machines Corporation, "List of IBM Patents or Patent Applications Treated as Related," submitted May 21, 2015, 2 Pages.
(Continued)

*Primary Examiner* — Chris Parry
(74) *Attorney, Agent, or Firm* — Peter B. Stewart; Moore & Van Allen PLLC

(57) ABSTRACT

A method for associating an emotional influencer to a post may include determining, by a processor, an emotional baseline for a user and detecting, by the processor, a post by the user on a social medium. The method may also include analyzing the content of the post to determine an emotion of the user based on the content of the post and determining a difference between the emotion of the user associated with the post and the emotional baseline of the user. The method may additionally include determining an emotional influencer of the post in response to the difference between the emotion of the user associated with the post and the emotional baseline of the user exceeding a preset threshold. The method may further include tagging the emotional influencer to the post based on the emotional influencer being related to the post.

16 Claims, 10 Drawing Sheets

(51) Int. Cl.
*G06F 17/28* (2006.01)
*H04L 12/58* (2006.01)
*G06F 16/335* (2019.01)

(56) References Cited

U.S. PATENT DOCUMENTS

| | | | |
|---|---|---|---|
| 2013/0110928 A1* | 5/2013 | Ghosh | G06Q 30/02 |
| | | | 709/204 |
| 2013/0212059 A1 | 8/2013 | Ameri-Yahia et al. | |
| 2014/0157153 A1* | 6/2014 | Yuen | A63F 13/795 |
| | | | 715/758 |
| 2014/0287387 A1* | 9/2014 | Vukasinovic | G09B 7/02 |
| | | | 434/236 |
| 2016/0055235 A1* | 2/2016 | Zhang | G06F 17/30684 |
| | | | 707/749 |

OTHER PUBLICATIONS

Gilad Mishne, "Experiments with Mood Classification in Blog Posts," In Proceedings of the 1st Workshop on Stylistic Analysis of Text for Information Access, Salvador, Brazil 2005, 8 pages.
Aditya Mogadala, et al., "Twitter User Behavior Understanding with Mood Transition Prediction," The 21st ACM International Conference on Information and Knowledge Management, 2012, 5 pages.
Wikipedia, "Natural Language Processing," downloaded from <http://en.wikipedia.org/wiki/Natural_language_processing> on Jun. 3, 2014, 11 pages.

* cited by examiner

EMOTION DICTIONARY

| EMOTION | VALUE/SCORE |
|---|---|
| AMAZED | 56 |
| AMUSED | 40 |
| CHEERFUL | 45 |
| DELIGHTED | 55 |
| DISILLUSIONED | 12 |
| DISMAYED | 38 |
| DISTRUSTING | 23 |
| ELATED | 70 |
| ENTHUSIASTIC | 60 |
| EXCITED | 65 |
| EXHILARATED | 85 |
| FONDNESS | 46 |
| GREIF-STRICKEN | 5 |
| HATEFUL | 2 |
| HURT | 16 |
| OPTIMISTIC | 50 |
| PROUD | 55 |
| REGRETFUL | 39 |
| SATISFIED | 52 |
| SHOCKED | 10 |
| SYMPATHY | 38 |
| TENDERNESS | 43 |
| VENGEFUL | 7 |
| ⋮ | |
| EMOTION N | XX |

FIG. 3

ASSOCIATION OF AN EMOTIONAL INFLUENCER TO A POST IN A SOCIAL MEDIUM

CROSS-REFERENCE TO RELATED APPLICATIONS

This application is a continuation of U.S. patent application Ser. No. 14/482,854, filed Sep. 10, 2014, the contents of which are hereby incorporated by reference in their entirety.

BACKGROUND

Aspects of the present invention relate to social networks, message boards, online mail clients and the like, and more particularly to a method, system and computer program product for associating an emotional influencer to a post in a social medium.

Online social networks are a universal mechanism to connect people and information in logical and organized ways which enable sharing and processing of information between the members of the social network. Common mechanisms for sharing and processing information on online social networks may include, but are not necessarily limited to, a wall or virtual wall or message board where a user or member of the social network can post messages for other users or members; an activity stream which may be a list of messages or posts received by a user or member and may also include a list of messages or posts sent by the user or member; a timeline that may chronologically list a series of events, and profiles of users or members that can be accessed for information about a particular user or member. These mechanisms enable users or members to rapidly share information with others and gather information from others in the network. Message boards and social networking posts are influenced by time, mood and environment. When a user reviews an old post from a month or more ago, the user may not understand why someone made the post or what the user may have been feeling at the time of the post or what the emotional state or mood of the user was at the time of the post. The post may have been influenced by a particular mood or emotion of the user, such as joy, happiness, depression, anger or other emotion. These emotions could have been brought on by a news event or other stimulating circumstance that occurred proximate the time of the event. Currently, there is no way to tell what a person may have been feeling at the time of a post.

BRIEF SUMMARY

According to one aspect of the present invention, a method for associating an emotional influencer to a post may include determining, by a processor, an emotional baseline for a user and detecting, by the processor, a post by the user on a social medium. The method may also include analyzing the content of the post to determine an emotion of the user based on the content of the post and determining a difference between the emotion of the user associated with the post and the emotional baseline of the user. The method may additionally include determining an emotional influencer of the post in response to the difference between the emotion of the user associated with the post and the emotional baseline of the user exceeding a preset threshold. The method may further include tagging the emotional influencer to the post based on the emotional influencer being related to the post.

According to another aspect of the present invention, a system for associating an emotional influencer to a post may include a processor and a module operating on the processor for associating an emotional influencer to a post. The module may be configured to perform a set of functions that may include determining an emotional baseline for a user and detecting a post by the user on a social medium. The set of functions may also include analyzing content of the post to determine an emotion of the user based on the content of the post and determining a difference between the emotion of the user associated with the post and the emotional baseline of the user. The set of functions may additionally include determining an emotional influencer of the post in response to the difference between the emotion of the user associated with the post and the emotional baseline of the user exceeding a preset threshold. The set of functions may further include tagging the emotional influencer to the post based on the emotional influencer being related to the post.

According to another aspect of the present invention, a computer program product for associating an emotional influencer to a post may include a computer readable storage medium having program instructions embodied therewith, wherein the computer readable storage medium is not a transitory medium per se. The program instructions may be executable by a device to cause the device to perform a method that may include determining an emotional baseline for a user and detecting a post by the user on a social medium. The method may also include analyzing content of the post to determine an emotion of the user based on the content of the post and determining a difference between the emotion of the user associated with the post and the emotional baseline of the user. The method may additionally include determining an emotional influencer of the post in response to the difference between the emotion of the user associated with the post and the emotional baseline of the user exceeding a preset threshold. The method may further include tagging the emotional influencer to the post based on the emotional influencer being related to the post.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein:

FIG. 3 is an example of an emotion dictionary in accordance with an embodiment of the present invention.

DETAILED DESCRIPTION

Figure 1A:
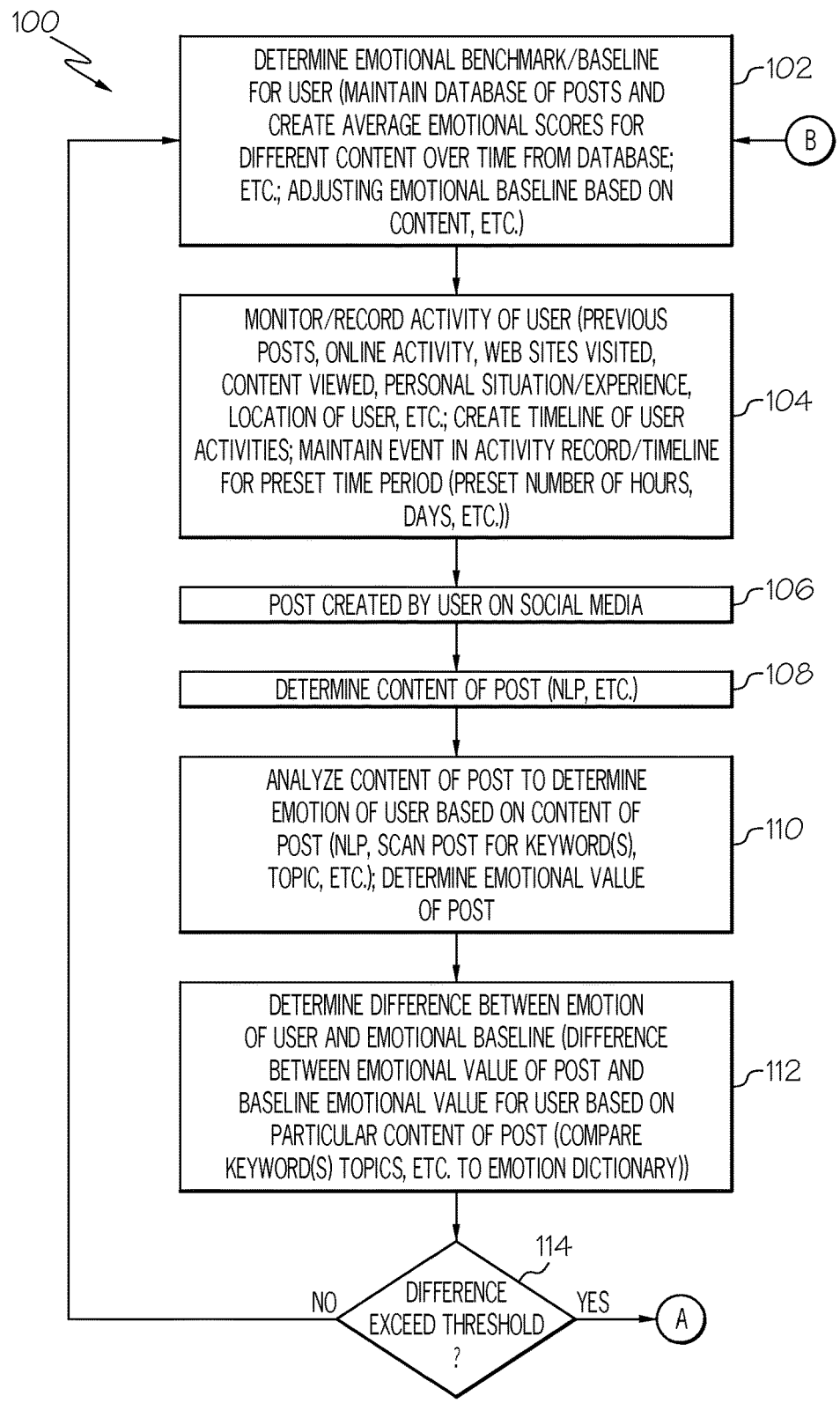
FIGS. 1A-1C (collectively FIG. 1) are a flow chart of an example of a method for associating an emotional influencer to a post in a social medium in accordance with an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1B:
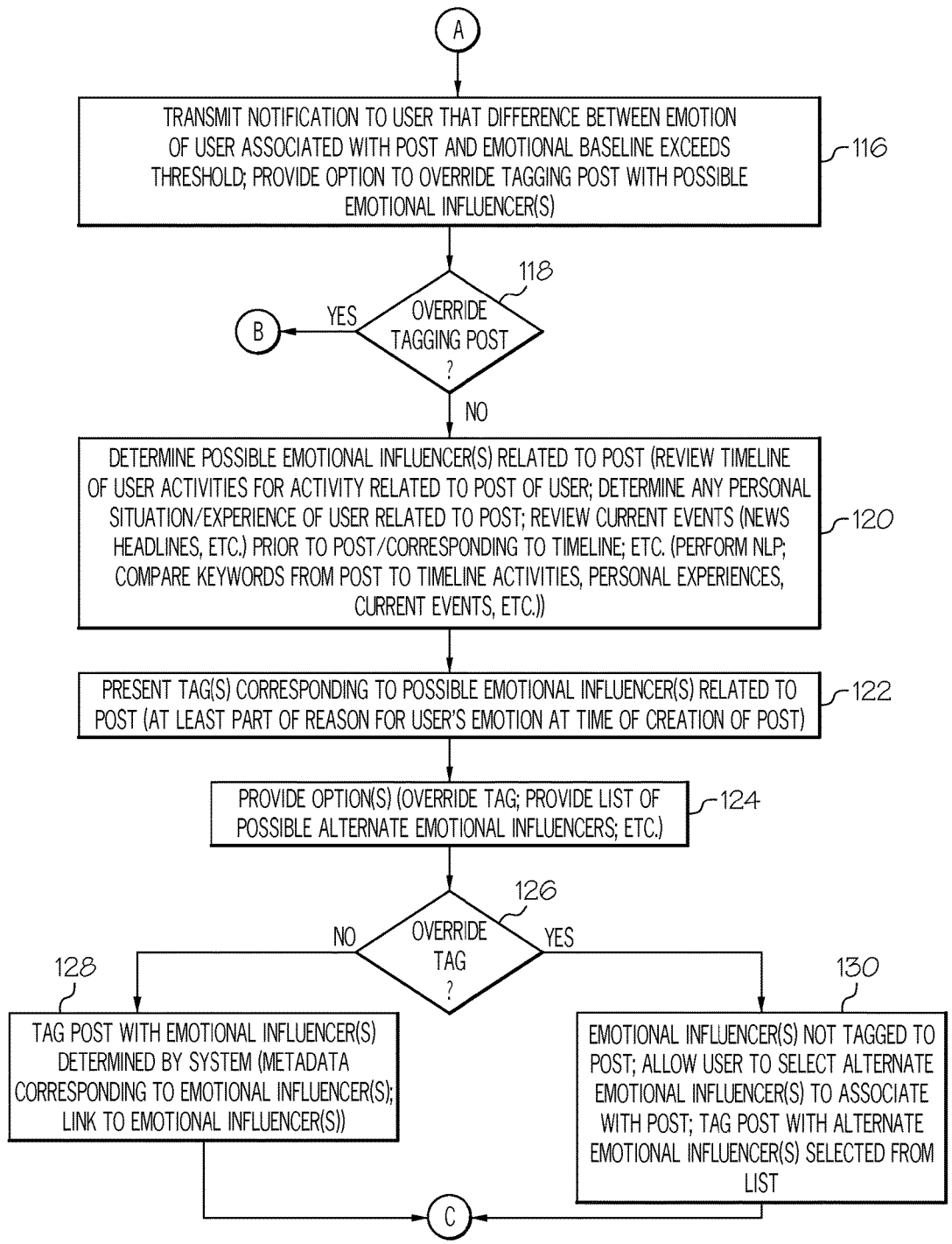
Figure 1C:
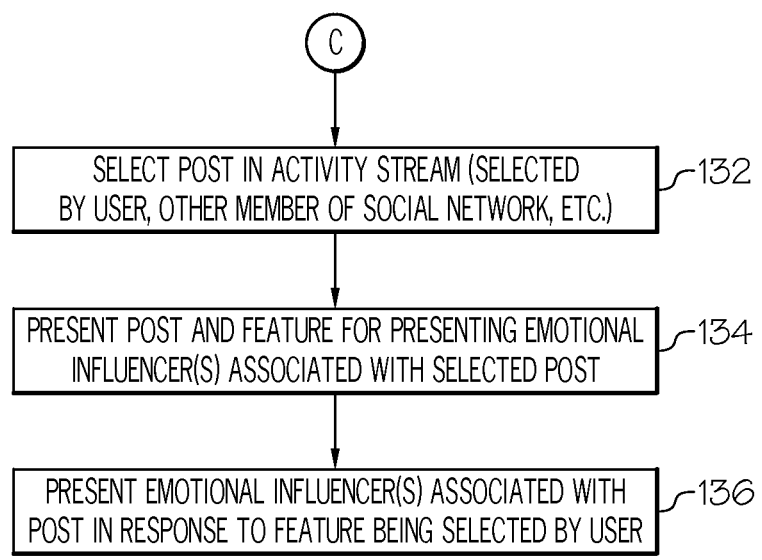

FIGS. 1A-1C (collectively FIG. 1) are a flow chart of an example of a method 100 for associating an emotional influencer to a post in a social medium in accordance with an embodiment of the present invention. In block 102, an emotional benchmark or baseline may be determined for the user. A database of posts may be maintained and average emotional values or scores for different types or kinds of content may be created over time from the different post in the database. The emotional baseline for a user may be adjusted based upon the content of a particular post. An example of a method for determining an emotional benchmark or baseline for a user will be described in more detail with reference to FIG. 2.

Figure 4:
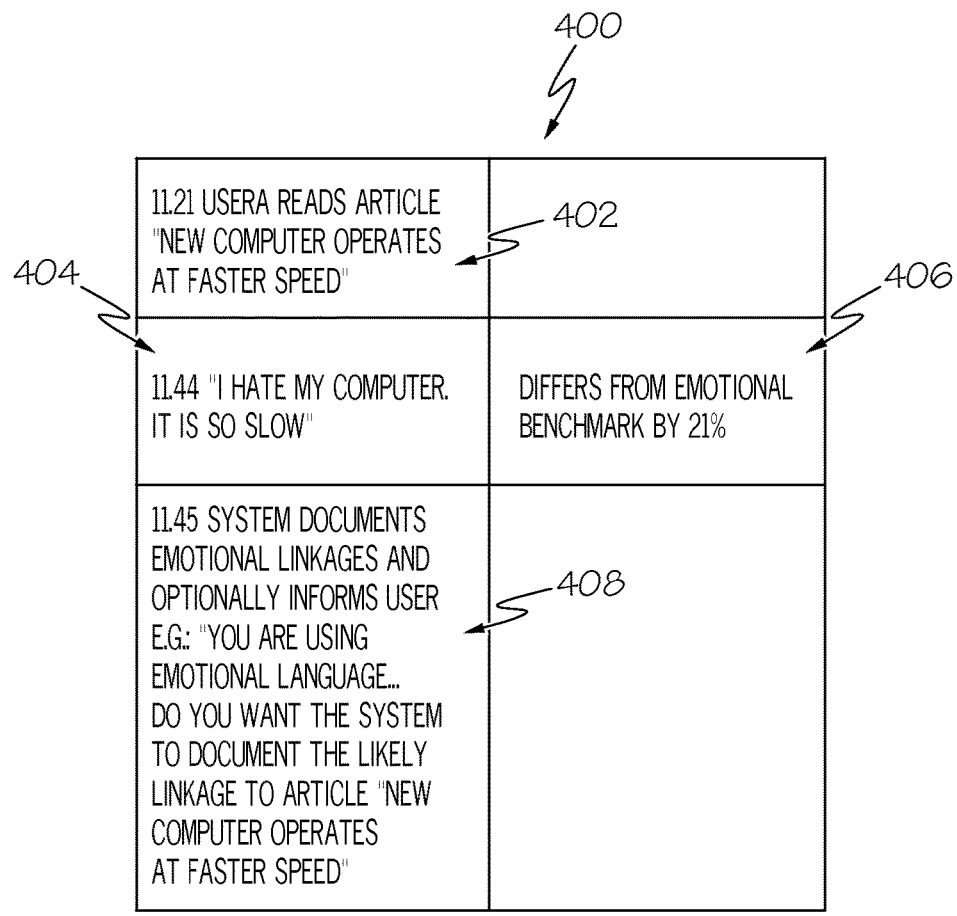
FIG. 4 is an example of an activity timeline for a user in accordance with an embodiment of the present invention.

In block 104, activities of the user may be monitored or tracked and recorded. Examples of the activities that may be monitored and recorded may include but is not necessarily limited to previous posts, online activity, websites visited, content viewed, personal situations and experiences of the user, movement of the user between different geographic locations and other activities of the user may be monitored or tracked and recorded. A timeline of activities of the user may be created and maintained. FIG. 4 is an example of an activity timeline 400 for a user in accordance with an embodiment of the present invention. An example of an application of the method 100 to the exemplary activity timeline 400 will be described with reference to FIG. 4. An event in the timeline of activities may be maintained for a preset time period to remove activities or events which may not be pertinent to current posts on social media by the user. For example, the preset time may include a preset number of hours, days, weeks, months, years or some other timeframe that may be set by the user or an administrator of the system described herein.

In block 106, a post may be created by the user on social media or a social medium. In block 108, content of the post may be determined. For example, the content of the post may be determined by natural language processing (NLP) or by some other technology to determine the content of the post.

In block 110, the content of the post may be analyzed to determine the emotion of the user based upon the content of the post. For example, natural language processing or some other technology or processing may be used to determine the emotion of the user based on the content of the post. For example, the post may be scanned for keywords, subject matter, topics or other content that may provide an indication of the emotion of the user when creating the post or feelings of the user in creating the post. An emotional value associated with the post may be determined from the analysis of the content. For example, terms or phrases that correspond to emotions may be compared to similar emotional terms or phrases in an emotion dictionary to determine an emotional value associated with the post. An example of an emotion dictionary will be described with reference to FIG. 3. Each emotion represented in the emotion dictionary may have a corresponding value or score. The value or score may be based on an intensity or level of human response represented by the particular term or word. The scores or values may be adjusted based on the demeanor of a particular user.

In block 112, a difference between the emotion of the user associated with the post and the emotional baseline of the user may be determined. In accordance with an embodiment, the difference between the emotion of the user associated with post and the emotional baseline of the user may be determined by the difference between the emotional value of the post and the value of the emotional baseline for the user based on the particular content of the post using the emotion dictionary. Keywords, topics or other characteristics determined from analysis of the content of the post may be compared to terms or words representing emotions in the emotion dictionary. The difference between the value or score for the post and the emotional baseline corresponding to any matches in the emotion dictionary may be determined.

In block 114, a determination may be made if the difference between the emotion of the user associated with the post and the emotional baseline of the user exceeds a preset threshold. If the difference does not exceed a preset threshold, the method may return to block 102 and the method 100 may continue similar to that previously described. If the difference between the emotion of the user associated with the post and the emotional baseline of the user exceeds the preset threshold, the method 100 may advance to block 116 (FIG. 1B).

In block 116, a notification may be transmitted to the user that a difference between the emotion of the user associated with the post and the emotional baseline of the user exceeds the preset threshold. In accordance with an embodiment, an option may be provided to the user to override tagging the post with a possible emotional influencer or emotional influencers. At this stage of the method 100, the user may make a decision whether or not to continue with the process of determining a possible emotional influencer or emotional influencers. An emotional influencer may be anything that may be causing the user to have a certain emotion or feel in creating a post or that may be emotionally affecting the user either positively or negatively during creation of the post. For example, an emotional influencer may include but is not necessarily limited to an activity in the user's timeline of activities, a personal situation or experience of the user that may be related to the post, a current event, such as news headline or other publicized event, or another factor that may be emotionally influencing the user to create the post or that may be emotionally affecting the user during creation of the post.

In block 118, if the user selected the option to override tagging the post with the emotional influencer, the method 100 may return to block 102 and the method 100 may continue similar to that previously described. If the user in block 118 selected not to override tagging the post with the emotional influencer, the method 100 may advance to block 120.

In block 120, a possible emotional influencer or emotional influencers related to the post may be determined. Examples of operations or procedures that may be performed to determine possible emotional influencers may include but is not limited to reviewing the timeline of user activities for activities related to the post of the user; determining any personal situations or experiences of the user that may be related to the post; reviewing current events, such as news headlines or other publicized events; or any other factors that may be emotionally influencing the user to create the post or that may be emotionally affecting the user during creation of the post. The method or system may access news feeds or any other sources for current events occurring prior to or at the time of the post. As previously described, natural language processing may be used to analyze the post and also in reviewing the different possible sources for emotional influencers described above to determine any possible emotional influencers that may be related to the post. For instance, keywords from the post may be compared to timeline activities of the user, personal situations or experiences of the user, current events or other factors that may be influencing the user to create the post or that may be emotionally affecting the user during creation of the post.

In block 122, a tag corresponding to a possible emotional influencer or tags corresponding to possible emotional influencers related to the post may be presented to the user. It should be noted that the possible emotional influencer or influencers may at least be part of the reason for the user's emotion at the time of creation of the post.

In block 124, an option or options with respect to the tags corresponding to the possible emotional influencer or influencers may be provided. For example, an option to override tagging the post with the emotional influencer or emotional influencers may be provided for the user to select whether or not to tag the post with the emotional influencer or influencers. In accordance with an embodiment, a list of possible alternative emotional influencers or other options may be provided for the user to select. An example of a graphical user interface (GUI) for providing different options for selection by the user with respect to the emotional influencer or influencers will be described in more detail with reference to FIG. 6.

In block 126, a determination may be made if the user selected the option to override tagging the emotional influencer or influencers to the post. If the user selected to override tagging the emotional influencer to the post, the method 100 may advance to block 128. In block 128, the post may be tagged with the emotional influencer or influencers determined by the method 100 or system. A tag including metadata corresponding to the emotional influencer or influencers may be tagged or associated with the post. The tag may include a link to the emotional influencer or influencers. For example, an icon or other feature including a link may be provided with the post that may be selected or clicked-on using a mouse or other computer pointing device to access the emotional influencer or influencers associated with the post.

If the user selected the option to override the tag in block 126, the method 100 may advance to block 130. In block 130, the emotional influencer or influencers determined by the method 100 or system are not tagged to the post. Alternatively, in accordance with the embodiment described in block 124, the user may be provided a list of alternate emotional influencers. The user may select an alternate emotional influencer or influencers to associate with the post rather than the emotional influencer suggested by the system in block 128. The post may be tagged with the alternate emotional influencer or influencers selected from the list by the user. Metadata corresponding to the selected emotional influencer or influencers may be tagged or associated with the post and the tag may include a link to the alternative emotional influencer or influencers.

In block 132, the post may be selected in an activity stream. The post may be selected by the user in an activity stream of the user or the post may be selected by another member of the social network in an activity stream of the other member. The post may be selected at a future time when the user may have forgotten what emotion the user may have been feeling at the time the post was created and what emotional influencer or influencers may have caused the user to create the post or may have been affecting the user during creation of the post.

In block 134, the post may be presented in response to the user selecting the post in the activity stream. A feature for presenting the emotional influencer or influencers associated with the selected post may also be presented. The feature may be an icon or other feature that may be selected or activated by the user using a mouse or other computer pointing device. The feature for presenting the emotional influencer or influencers of the user associated with a post may be presented to other members of the social network if other members of the social network are permitted to access the emotional influencers for posts of others in the activity stream.

In block 136, the emotional influencer or influencers associated with the post may be presented in response to the feature being selected by the user or other user if permitted.

Figure 2:
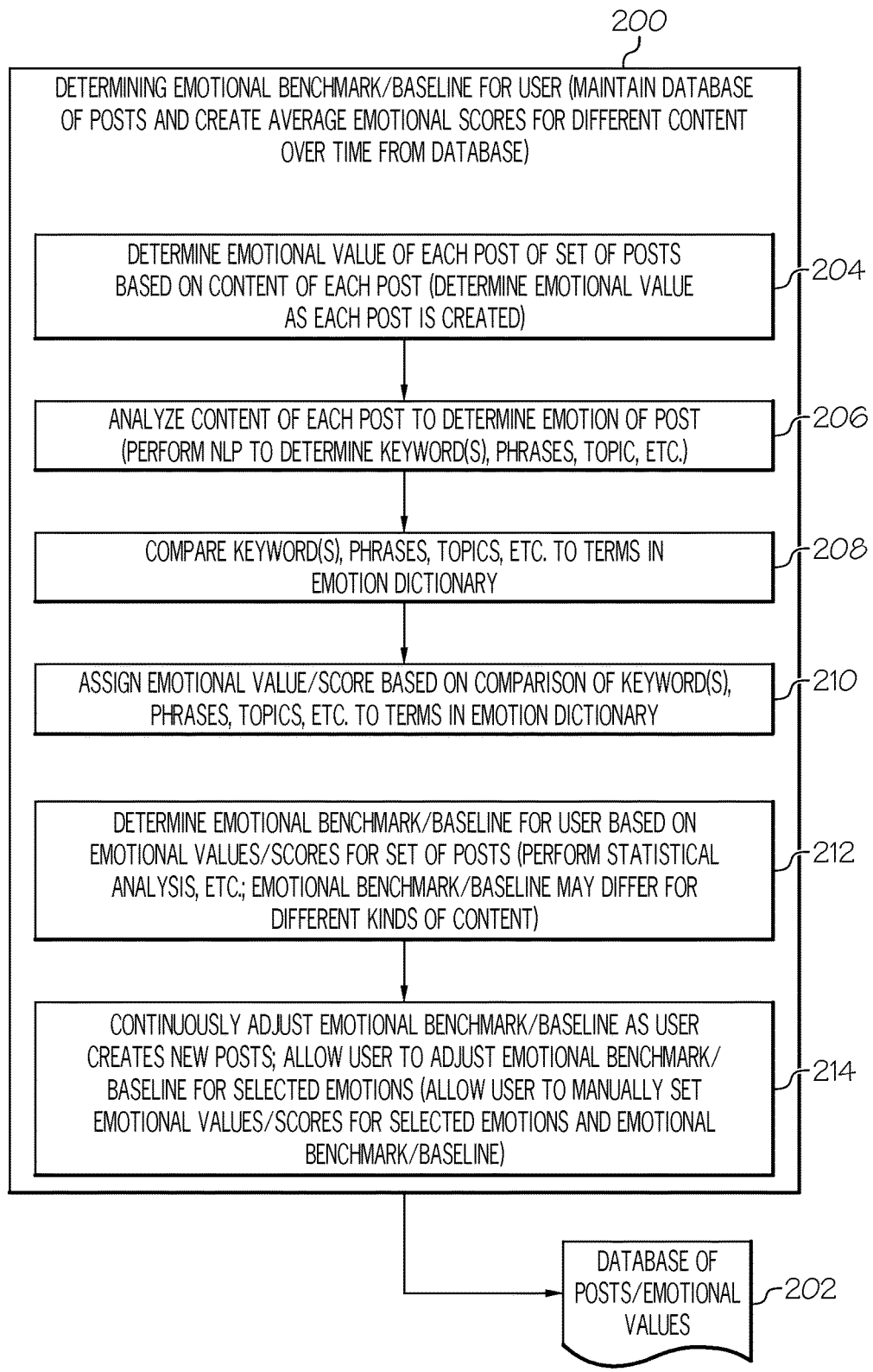
FIG. 2 is flow chart of an example of a method for determining an emotional benchmark or baseline for a user in accordance with an embodiment of the present invention.

FIG. 2 is flow chart of an example of a method 200 for determining an emotional benchmark or baseline for a user in accordance with an embodiment of the present invention. Determining the emotional benchmark or baseline for the user may include maintaining a database 202 of posts and emotional values, and creating and storing in the database 202 average emotional scores for different content of posts for the user over time from the different posts.

In block 204, an emotional value or score of each post of a set of posts may be determined based on the content of each post. The emotional value or score of each post may be determined as each post is created by the user. The emotional value or score may be determined using an emotion dictionary.

In block 206, the content of each post may be analyzed to determine an emotion of each post. For example, natural language processing (NLP) may be performed to determine a keyword or keywords, phrase or phrases, topic or other characteristic or characteristics of the content of a particular post that may be useful in determining the emotion of the particular post.

In block 208, the keyword or keywords, phrase or phrases, topic or other characteristic of the content may be compared to terms in an emotion dictionary, such as the exemplary emotion dictionary 300 in FIG. 3, or another mechanism may be used for determining the emotion of the post.

Referring also to FIG. 3, FIG. 3 is an example of an emotion dictionary 300 in accordance with an embodiment of the present invention. The emotion dictionary 300 may include a multiplicity of terms 302 or phrases that each define a separate emotion. A value or score 304 may be assigned to each emotion 302 or determined for each emotion 302. The value or score 304 for each emotion 302 may be preset or determined based on a strength or intensity level of a feeling that a particular emotional term may cause in a human response. For example, a survey may be taken of a sample of people asking each person to score or assign a value to each emotional term on a strength or intensity level of a feeling or emotional response evoked in that person by each particular emotional term. The score or value corresponding to the strength or intensity level of feeling may be based on a certain scale. As a non-limiting example, the scale may be 0-100 where 0 may be little or no emotional effect or feeling and 100 may be the highest or strongest emotional effect or feeling.

Referring back to FIG. 2, in block 210, the emotional value or score may be assigned to the particular post currently being analyzed based on the comparison of the keyword or keywords, phrases, topics or other characteristics from the particular post to terms in the emotion dictionary. The corresponding value or score for any emotional term in the emotion dictionary that matches or proximately matches a keyword or keywords, phrases, etc. from NLP or other analysis of the particular post will be assigned to the post as corresponding to the emotion of the post. This process will be performed for each post in the set of post or as each post is created and stored in the database 202.

In block 212, the emotional benchmark or baseline may be determined for the user based on the emotional values or scores for the set of post. Statistical analysis may be performed to determine the emotional benchmark or baseline for the user. For example, an average of the emotional scores or values may be determined for different posts that may have a similar content or that may cause a similar emotional response. A different emotional benchmark or baseline may be determined for different kinds of content of posts.

In block 214, the emotional benchmark or baseline may be continuously adjusted as the user creates new posts. The user may also be allowed to adjust the emotional benchmark or baseline for selected emotions. For example, the user may be allowed to manually set emotional values or scores for selected emotions in the emotion dictionary 300. The user may also be allowed to select an emotional benchmark or baseline for a particular type of content, subject matter, topic or other characteristic of a post.

FIG. 4 is an example of an activity timeline 400 for a user in accordance with an embodiment of the present invention. As illustrated in the exemplary activity timeline 400, at 11:21 the user reads an article (activity 402). At 11:44 the user creates a post 404. Similar to that previously described with respect to blocks 108-116 of the exemplary method 100 in FIGS. 1A-1C, the method or system may analyze the post 404 and determine that a difference exists between the post and the emotional benchmark or baseline for the user based on the content of the post. A notification 406 may be transmitted to the user that a difference between the emotion of the user associated with the post and the emotional benchmark or baseline of the user exceeds a preset threshold. The amount of the difference may be included in the notification. The amount of the difference may be expressed as a percentage of the difference of the emotion of the post from the benchmark.

At 11:45 activity 408 may occur in which the system or method may document an emotional linkage between the post 404 and the previous activity 402 of the user of reading the article. The system or method may optionally inform the user or ask the user to confirm the link between the post and a prior activity in the activity stream 400 of the user. This is similar to the override option described with reference to blocks 124-130 in FIG. 1B. In the exemplary timeline of activities 400 in FIG. 4, the method or system may ask the user if the user wants the system to link the post 404 to the article the user read in the previous activity 402.

Figure 5:
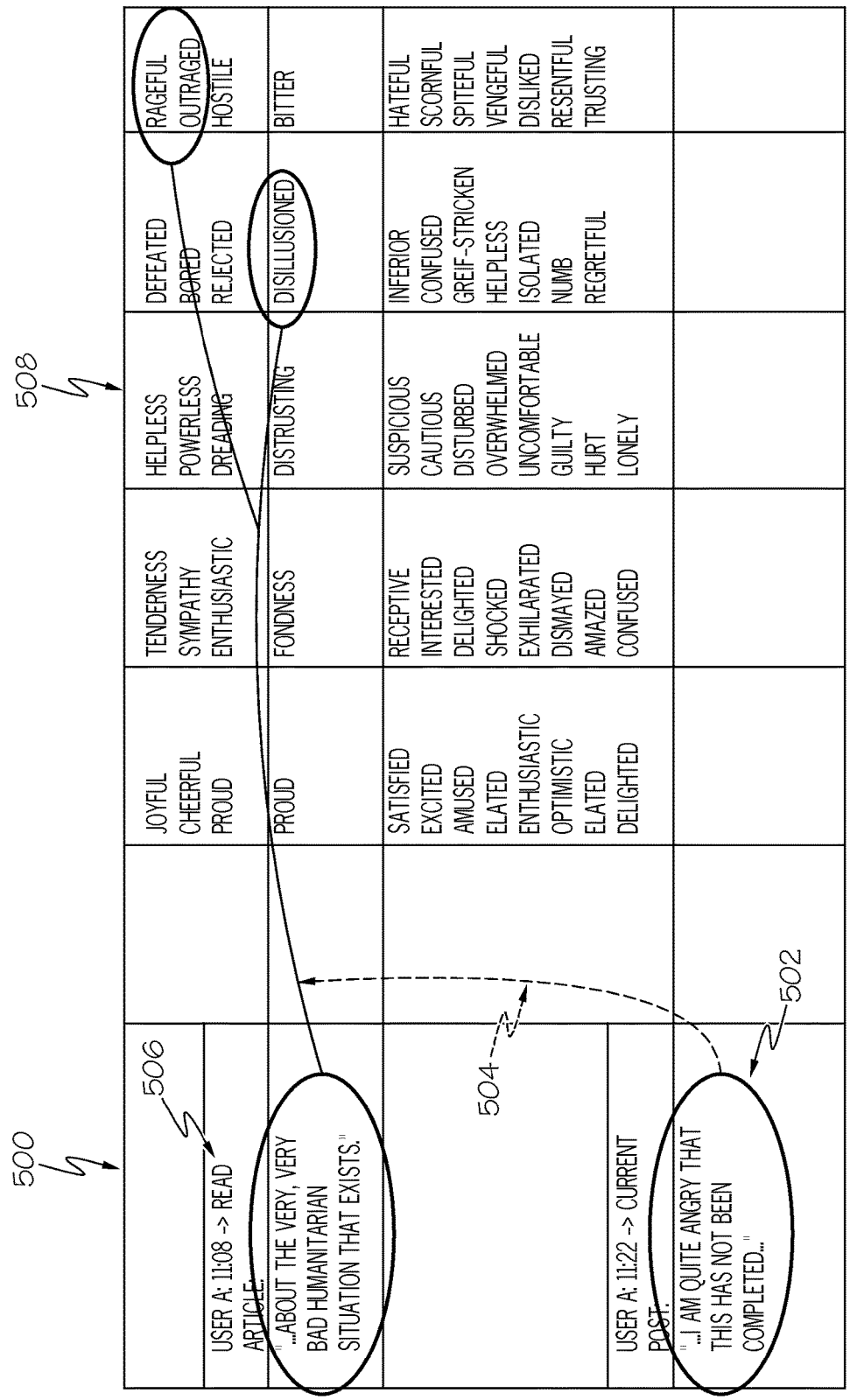
FIG. 5 is an example of an activity timeline and analyzing a post in the activity timeline to determine whether there is a link to an earlier activity in the timeline based on an emotion of the user at the time the post was created in accordance with an embodiment of the present invention.

FIG. 5 is an example of an activity timeline 500 and analyzing a post 502 in the activity timeline 500 to determine whether there is a link 504 to an earlier activity 506 in the timeline 500 based on an emotion of the user at the time of the post 502 in accordance with an embodiment of the present invention. At 11:08 the activity 504 of the user reading an article is detected. The user may be reading the article online or from some other source. The article may be analyzed similar to that previously described using natural language processing, for instance, or other processing to determine an emotion or emotions of the user that may be associated with reading the article. An emotion or emotions of the user that may be associated with reading the article may be compared to emotional terms in an emotion dictionary 508 to determine or detect any matches or near matches between the emotion that may be associated with the article and emotional terms in the emotion dictionary 508 as illustrated in the example in FIG. 5.

At 11:22 the activity 502 of the user creating a post may be detected by the system or method. The post may be analyzed similar to that previously described to determine an emotion of the user that may be associated with the post 502. The emotion or emotions of the user that may be associated with the post may also be compared to terms in the emotion dictionary 508 and to determine if there may be a link between the post 502 and the previous activity 506 based on any matches or correspondence between the emotion or emotions of the post 502 and the previous activity 506 in the activity stream 500. If there is a correspondence between the emotion or emotions of the post 502 and the previous activity 506, the previous activity 506 may be determined to be an emotional influencer of the post 502. The post 502 may then be tagged with the emotional influencer corresponding to the previous activity 506. Similar to that previously described, in accordance with an embodiment, the user may be allowed to confirm the link between the post 502 and the previous activity 506 before tagging or to select an alternative emotional influencer for tagging to the post 502.

Figure 6:
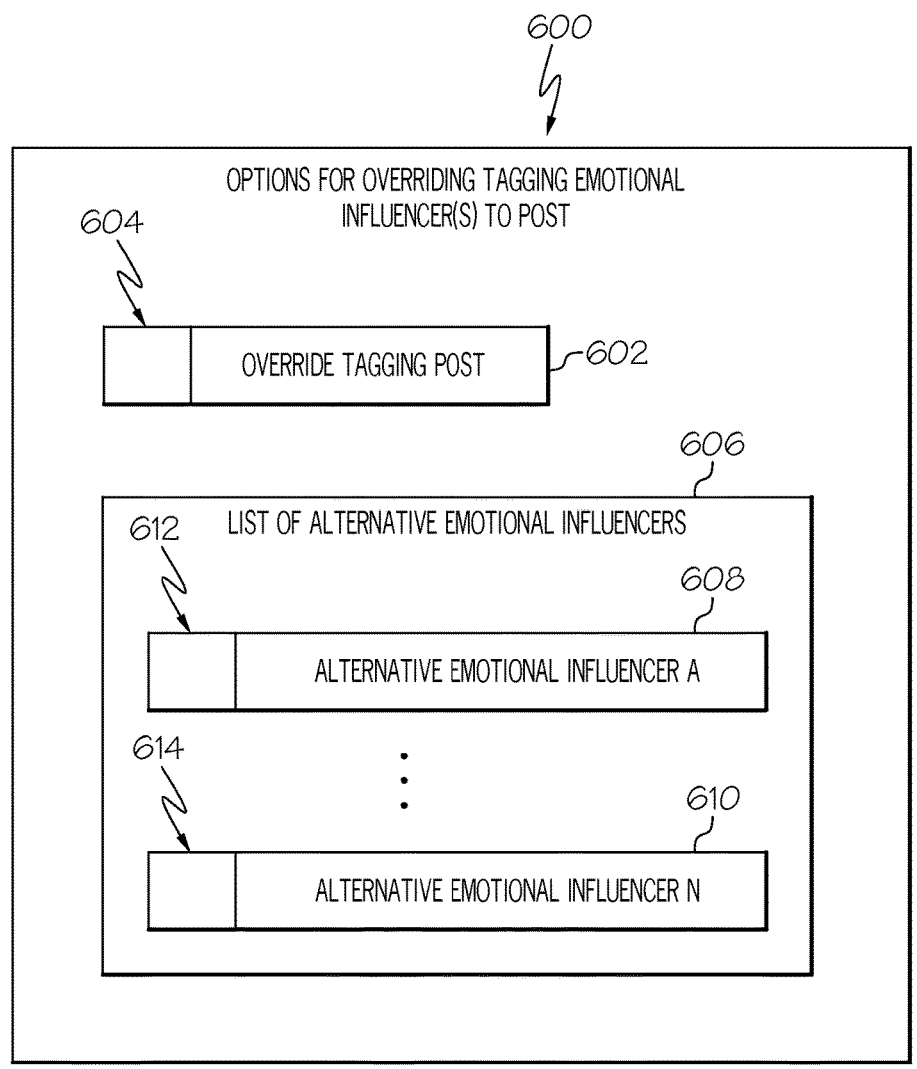
FIG. 6 is an example of a graphical user interface (GUI) that provides options for tagging a post with an emotional influencer in accordance with an embodiment of the present invention.

FIG. 6 is an example of a graphical user interface (GUI) 600 that provides options for tagging a post with an emotional influencer in accordance with an embodiment of the present invention. The GUI 600 may include a feature 602 to override tagging the post with an emotional influencer. In the example illustrated in FIG. 6, the feature 602 for overriding tagging the post may be a radio button, checkbox box 604 or similar feature that may be operated or checked by the user using a mouse, other computer pointing device, a key of a keyboard, etc.

The GUI 600 may also include a list of alternative emotional influencers 606 that the user may select from for association with a particular post. One or more of the alternative emotional influencers 608-610 may be selected by the user for association with a particular post in an activity stream rather than an emotional influencer determined by the system or method similar to that described in FIGS. 1A-1C. A radio button 612-614, check box or other feature may be provided for selecting one or more alternative emotional influencers 608-610.

Figure 7:
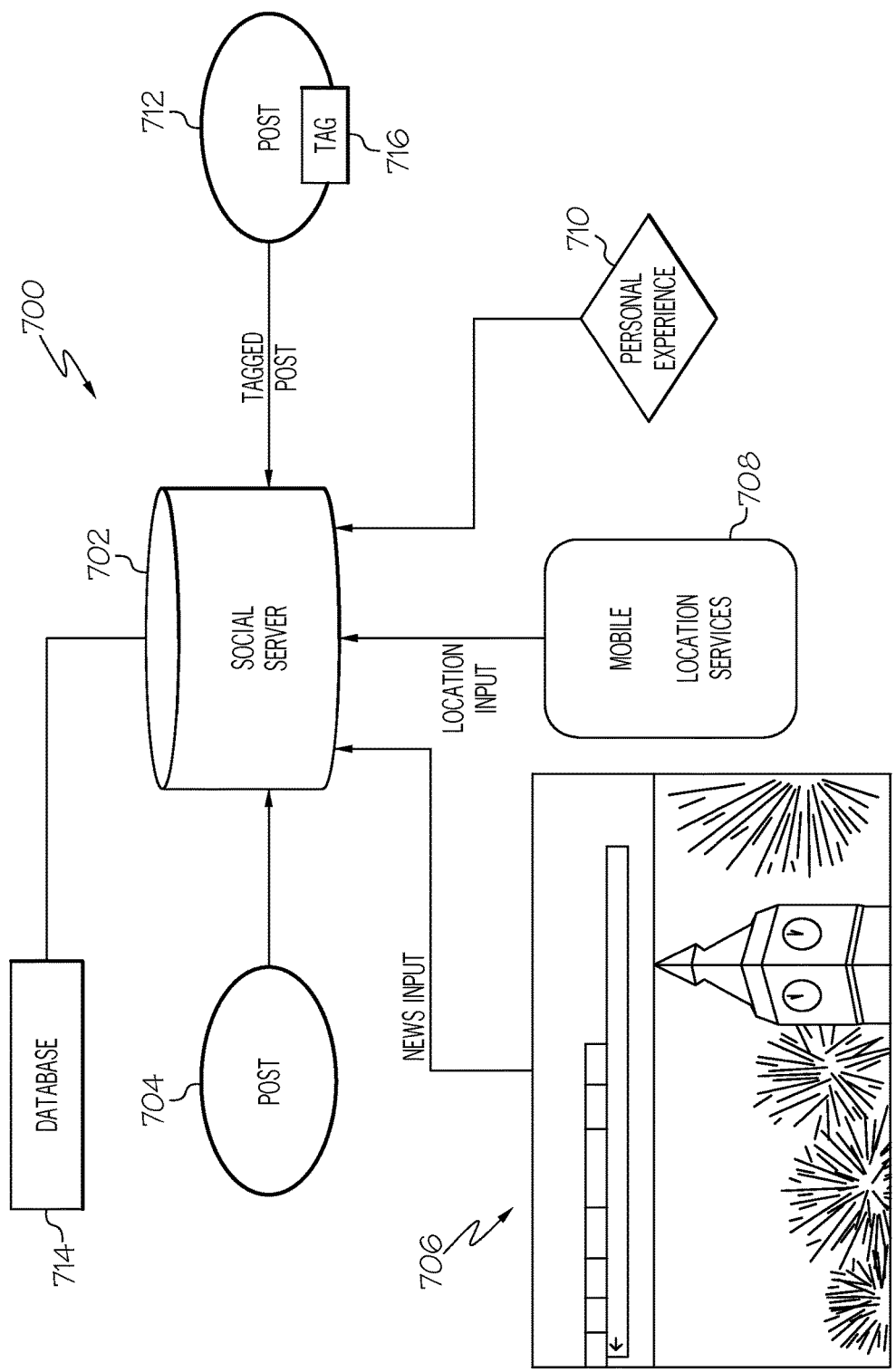
FIG. 7 is a block schematic diagram of an example of a system for tagging a post with an emotional influencer in accordance with an embodiment of the present invention.

FIG. 7 is a block schematic diagram of an example of a system 700 for tagging a post with an emotional influencer in accordance with an embodiment of the present invention. The system 700 may include a social server 702 that may receive various inputs that may be used for determining an emotional influencer or emotional influencers that may be tagged to a particular post 704 created by a user and received by the social server 702. Examples of the various inputs may include but is not necessarily limited to a news input 706, location services 708, such as location services that may be associated with a mobile device and used to determine the geographic location of the mobile device, personal experiences 708 of the user, or any other inputs that may be useful in determining emotional influencers for tagging or associating with the particular post 704. The particular post 704 may be tagged with the emotional influencer or emotional influencers similar to that previously described. The tagged post 712 may be stored in the social server 702 or in a database 714 associated with the social server 702. The tagged post 712 along with the tag 716 may be provided to a user in response to the user clicking-on or otherwise selecting the tagged post 714 in an activity stream similar to that previously described. The tag 716 may be a link to the emotional influencer that caused the user to create the post or motivated the user to create the post. The tag 716 may also include a summary or short description of the emotional influencer to assist the user in recalling the emotion or emotions of the user at the time of the creation of the post in addition to allowing the user to access the emotional influencer.

Figure 8:
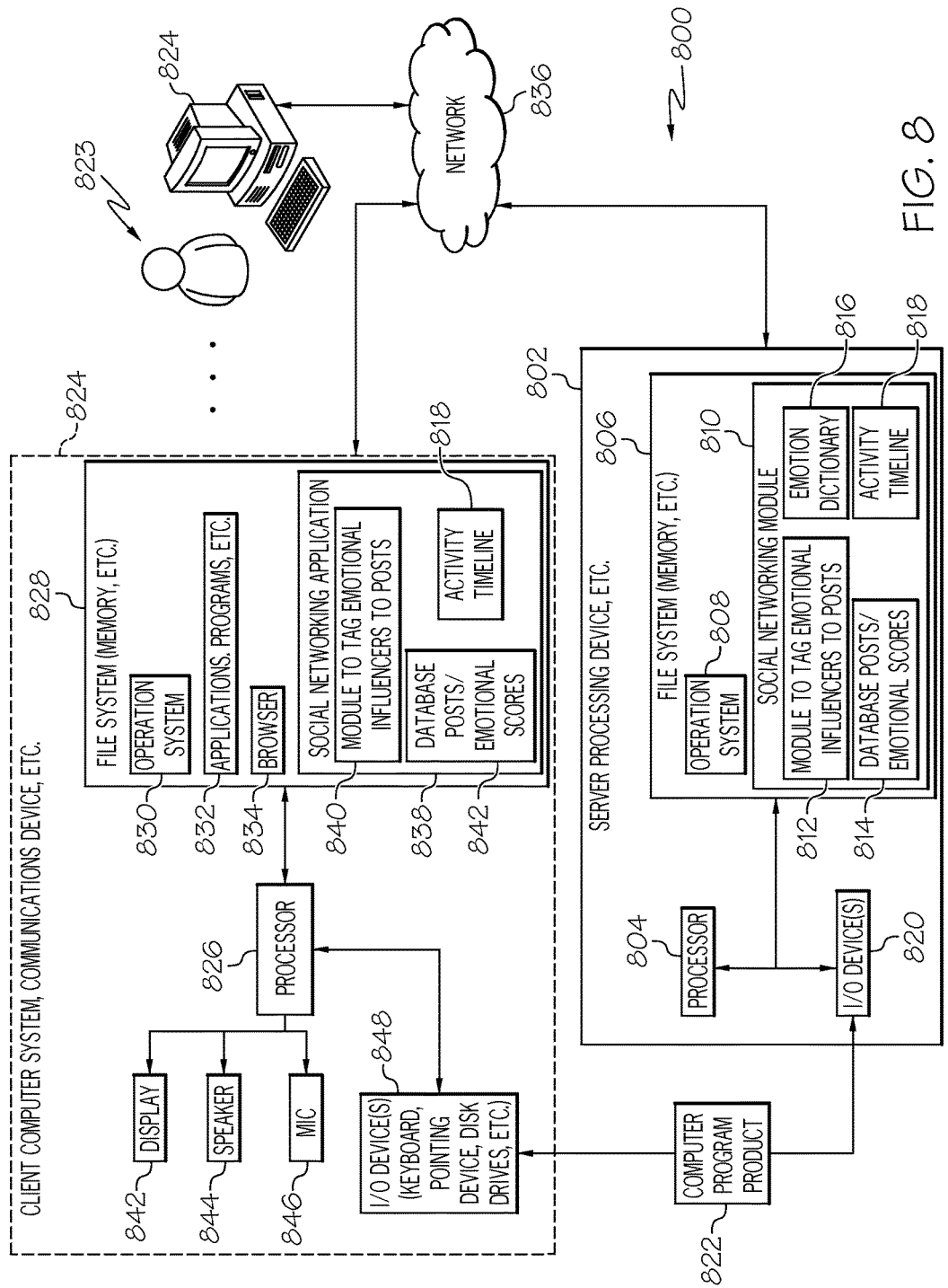
FIG. 8 is a block schematic diagram of an example of a system configured for associating or tagging an emotional influencer to a post in accordance with another embodiment of the present invention.

FIG. 8 is a block schematic diagram of an example of a system 800 configured for associating or tagging an emotional influencer to a post in accordance with another embodiment of the present invention. The method 100 of FIGS. 1A-1C and method 200 of FIG. 2 may be embodied in and performed by the system 800. The system 800 may include a processing device 802. The processing device 802 may be a server or similar processing device. The processing device 802 may include a processor 804 for controlling operation of the processing device 802 and for performing functions, such as those described herein with respect to tagging an emotional influencer or emotional influencers to a post. The processing device 802 may also include a file system 806 or memory. An operating system 808, applications and other programs may be stored on the file system 806 for running or operating on the processor 804. A social networking module 810 or system may also be stored on the file system 806 and may be compiled and run on the processor 804 to perform the functions for conducting online communications or activity streams between users similar to that described herein. The social networking module 810 may be any type of online communications mechanism for online communications or conversations. The methods 100 and 200 of FIGS. 1A-1C and 2 respectively may be embodied in the social networking module 810 and performed by the processor 804 when the social networking module 810 is compiled and run on the processor 804.

The social networking module 810 may include a module to tag emotional influencers to posts 812. The social networking module 810 may be configured to perform functions similar to those described with reference to the methods 100 and 200 in FIGS. 1A-1C and 2.

The social networking module 810 may also include a database 814 for storing posts and emotional scores that may be similar to database 202. The social networking module 810 may additionally include an emotion dictionary 816 that may be similar to the exemplary emotion dictionary 300 in FIG. 3. The social networking module 810 may further include or store an activity timeline 818 for a user or alternatively, the activity timeline 818 may be stored on the client computer system 824 of the user as described below. The components 812, 814, 816 and 818 may also be separate components from the social networking module 810 and may operate in association with the social networking module 810.

The processing device 802 may also include one or more input devices, output devices or combination input/output devices, collectively I/O devices 820. The I/O devices 820 may include, but are not necessarily limited to, a keyboard or keypad, pointing device, such as a mouse, disk drive and any other devices to permit a user to interface with and control operation of the processing device 802 and to access the social networking module 810 or system. At least one of the I/O devices 820 may be a device to read a computer program product, such as computer program product 822. The computer program product 822 may be similar to that described in more detail herein. The social networking module 810 may be loaded on the file system 806 from a computer program product, such as computer program product 822.

A member of a social network or user 823 of the system 800 for social networking may use a computer system 824 or communications device to access the processing device 802 or server and social networking module 810 or system. The computer system 824 or communications device may be any sort of communications device including a mobile or handheld computer or communications device. The computer system 824 may include a processor 826 to control operation of the computer system 824 and a file system 828, memory or similar data storage device. An operating system 830, applications 832 and other programs may be stored on the file system 828 for running or operating on the processor 826. A web or Internet browser 834 may also be stored on the file system 828 for accessing the processing device 802 or server via a network 836. The network 836 may be the Internet, an intranet or other private or proprietary network.

In accordance with an embodiment, a social networking application 838, feature or module may also be stored on the file system 828 and operate on the processor 826 of the user's computer system 824. The social networking application 838 may be any sort of online communications mechanism, such as a social networking or social media application, electronic mail client or email application, or other application for online communications or conversations capable of performing the functions and operations described herein. The social networking application 838 may include a module 840 to tag emotional influencers to posts similar to that described herein. In another embodiment, the module 840 to tag emotional influencers to posts may be a separate module from the social networking application 838 and operate in cooperation with the social networking application 838 to perform the functions described herein.

The social networking application 838 may also include a database 842 for storing posts and emotional scores or the database 842 may be separate from the social networking module 838. In an embodiment, the social networking application 838 may also maintain the activity timeline 818 for the user rather than the processing device 802 or server. In a further embodiment, an activity timeline 818 may be maintained on both the client computer system 824 and the server or processing device 802.

The social networking application 838 operating on the computer system 824 may interface with or operate in conjunction with the social networking module 810 or system on the processing device 802 or server to perform the functions and operations described herein for tagging emotional influencers to posts in activity streams or the like. Accordingly, social networking application 838 operating on the computer system 824 may perform some of the functions and operations of the methods 100 and 200 and social networking module 810 operating on the server 802 may perform other functions of the methods 100 and 200. Some embodiments of the present invention may include only the social networking module 810 and module 812 to tag emotional influencers to posts on the processing device 802 or server, and other embodiments may include only the social networking application 838 and module 840 on the client computer system 824 or communications device.

The computer system 824 may also include a display 842, a speaker system 844, and a microphone 846 for voice communications. One or more user interfaces may be presented on the display 842 for controlling operating the social networking module 810 and social networking application 838 and for performing the operations and functions described herein. For example, activity streams similar to activity streams 400 and 500 of FIGS. 4 and 5 respectively and the exemplary GUI 600 of FIG. 6 may be presented to a user for controlling operation of tagging emotional influencers to the posts.

The computer system 824 may also include one or more input devices, output devices or combination input/output devices, collectively I/O devices 848. The I/O devices 848 may include a keyboard or keypad, pointing device, such as a mouse, disk drives and any other devices to permit a user, such as user 823, to interface with and control operation of the computer system 824 and to access the social networking application 838 and social networking module or system 810 on server 802. The I/O devices 848 may also include at least one device configured to read computer code from a computer program product, such as computer program product 822.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method for associating an emotional influencer to a post, comprising:
   determining, by a processor, an emotional baseline for a user;
   detecting, by the processor, a post by the user on a social medium;
   analyzing, by the processor, content of the post to determine an emotion of the user based on the content of the post;
   determining, by the processor, a difference between the emotion of the user associated with the post and the emotional baseline of the user;
   determining, by the processor, an emotional influencer of the post in response to the difference between the emotion of the user associated with the post and the emotional baseline of the user exceeding a preset threshold, wherein the emotional influencer comprises a cause of the emotion of the user in creating the post or that is emotionally affecting the user during creation of the post and wherein determining the emotional influencer comprises at least one of:
   reviewing a timeline of activities of the user; and
   reviewing a set of news headlines or publicized events;
   presenting the emotional influencer related to the post to the user;
   providing an option comprising a list of alternate emotional influencers for selection by the user for tagging to the post, each alternate emotional influencer being a possible cause of the emotion of the user in creating the post or that is emotionally affecting the user during creation of the post; and
   tagging a selected alternate emotional influencer from the list of alternate emotional influencers to the post in response to the user selecting the alternate emotional influencer as the cause of the emotion of the user in creating the post or that is emotionally affecting the user during creation of the post.

2. The method of claim 1, further comprising creating the timeline of activities of the user by tracking actual activities of the user.

3. The method of claim 2, wherein determining the emotional influencer comprises performing natural language processing on the post to find a relationship between the post and at least one of a particular activity in the timeline of activities, and a particular news headline or publicized event of the set of news headlines or publicized events.

4. The method of claim 2, wherein determining the emotional influencer comprises:
   determining a keyword from the post:
   comparing the keyword from the post to at least one of the timeline of activities of the user, and the set of news headlines or publicized events, to determine the emotional influencer based on a match between the keyword and at least one of a particular activity in the timeline of activities, and a particular news headline or publicized event of the set of news headlines or publicized events.

5. The method of claim 1, wherein analyzing the content of the post to determine the emotion of the user comprises performing natural language processing on the post.

6. The method of claim 1, wherein determining the difference between the emotion of the user and the emotional baseline comprises determining a difference between an emotional value associated with the post and a baseline emotional value for the user based on a particular content of the post.

7. The method of claim 6, further comprising using an emotion dictionary to determine the difference between the emotional value associated with the post and the baseline emotional value for the user based on the particular content of the post.

8. The method of claim 7, wherein the emotion dictionary comprises:
   a multiplicity of terms or phrases that each define a separate emotion; and
   a numerical value or score assigned to each term or phrase that defines the separate emotion, wherein the numerical value or score is based on an intensity level of feeling that a particular term or phrase evokes in a human response from a survey that asks each person to score or assign a particular numerical value within a scale of values to each term or phrase based on the intensity level of feeling or emotional response evoked by each particular term or phase that defines the separate emotion.

9. The method of claim 1, further comprising:
transmitting a notification to the user that the difference between the emotion of the user associated with the post and the emotional baseline of the user exceeds the preset threshold; and
providing an option to override tagging the post with the emotional influencer.

10. The method of claim 1, further comprising:
providing an option comprising overriding tagging the emotional influencer to the post, wherein the emotional influencer is not tagged to the post in response to the user selecting the option to override tagging the emotional influencer to the post.

11. The method of claim 1, wherein determining the emotional baseline for the user comprises:
determining an emotional value of each post of a set of posts based on content of each post; and
determining the emotional baseline from the emotional value for each post of the set of posts.

12. The method of claim 11, wherein the emotional baseline differs for different content.

13. The method of claim 1, further comprising adjusting the emotional baseline for the user based on the content of the post.

14. The method of claim 1, wherein the cause of the emotion of the user, in creating the post or that is emotionally affecting the user during creation of the post, comprises at least one of:
an activity in a timeline of activities of the user; and
a particular news headline or publicized event of the set of news headlines or publicized events.

15. The method of claim 1, wherein tagging the emotional influencer to the post comprises including a link associated with the post that accesses the cause of the emotion of the user.

16. The method of claim 1, further comprising:
selecting the post in an activity stream;
presenting the post and a feature for presenting the cause of the emotion of the user, in creating the post or that is emotionally affecting the user during creation of the post, in response to the post being selected; and
presenting the cause of the emotion of the user in response to the feature being selected.

* * * * *